Feb. 12, 1957 H. S. BREMBECK 2,781,023
POULTRY NEST ASSEMBLY
Filed May 19, 1955 2 Sheets-Sheet 1
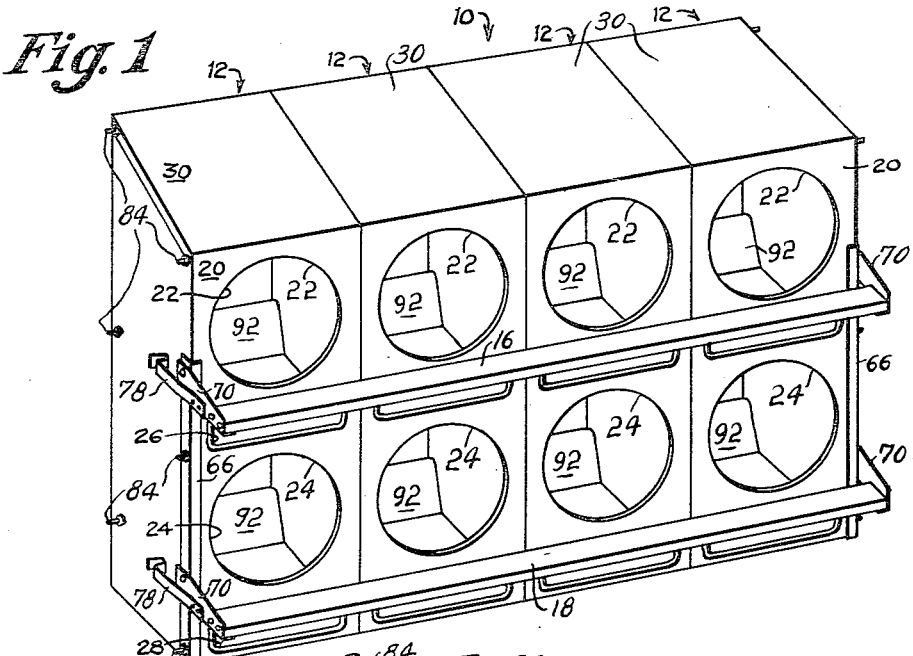
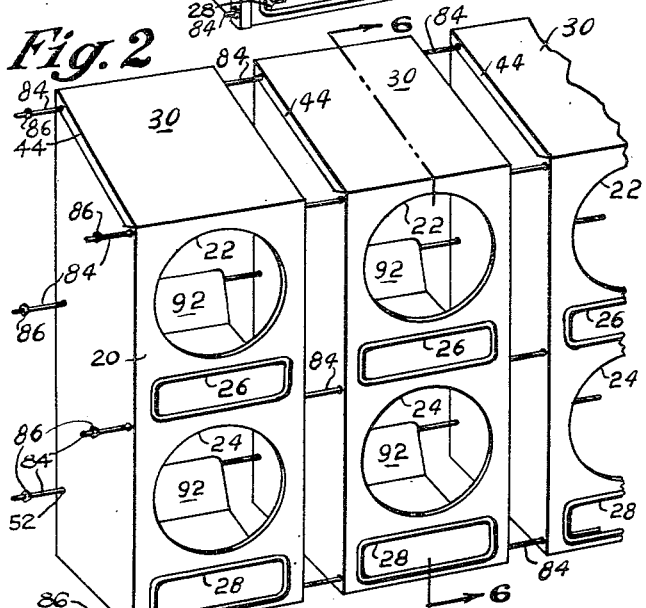
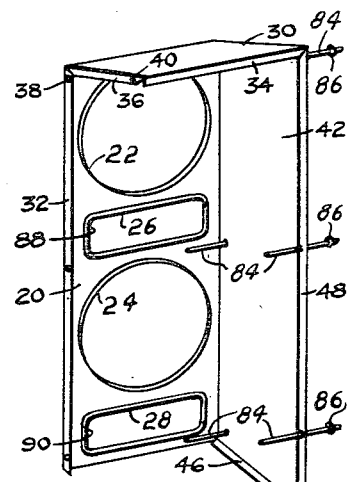
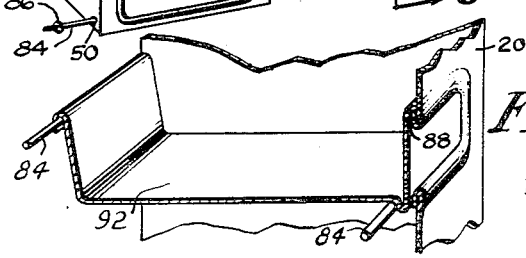
INVENTOR
H. S. BREMBECK
BY Kimmel & Crowell
ATTORNEYS

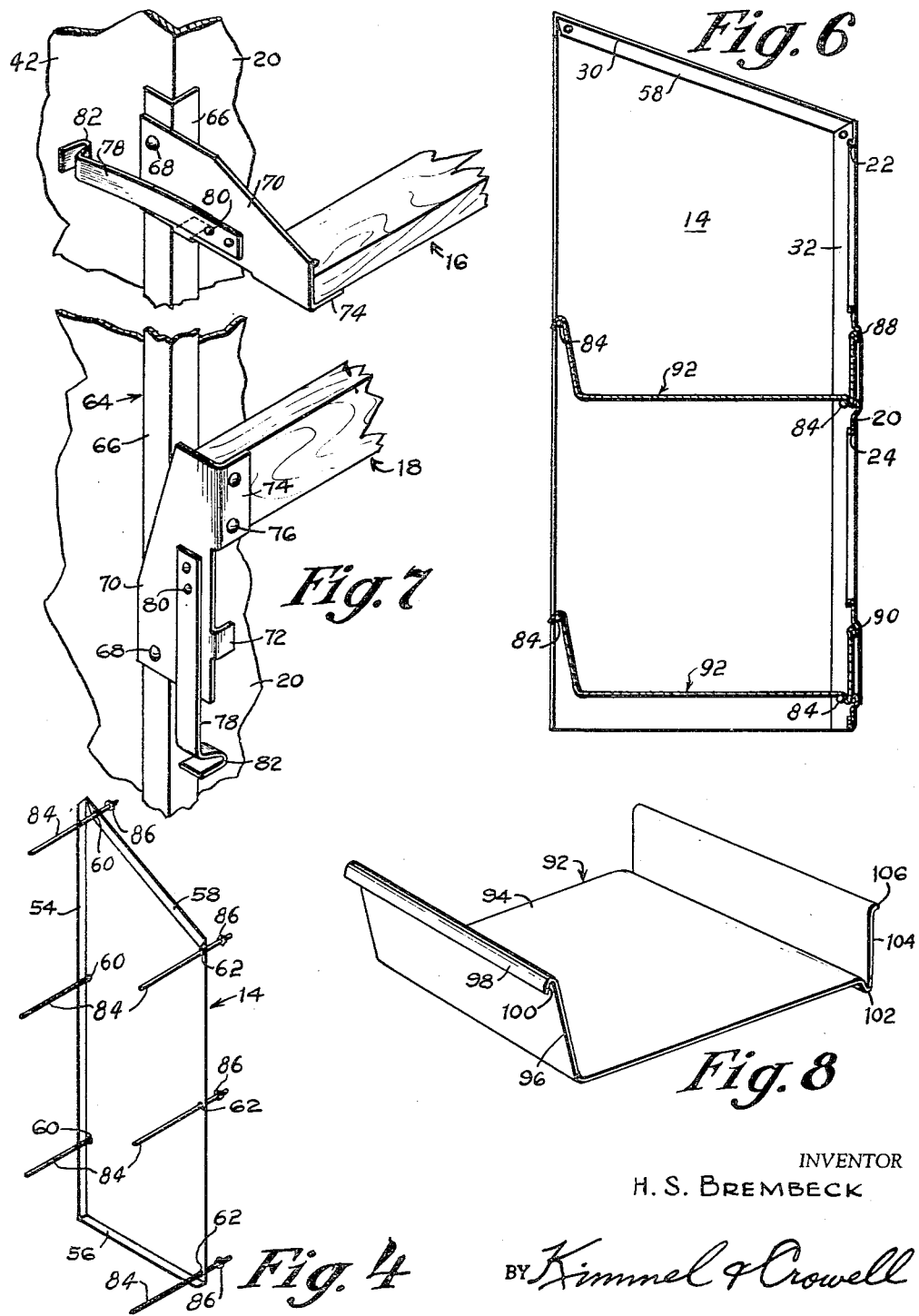

United States Patent Office 2,781,023
Patented Feb. 12, 1957

2,781,023

POULTRY NEST ASSEMBLY

Howard S. Brembeck, Milford, Ind.

Application May 19, 1955, Serial No. 509,470

7 Claims. (Cl. 119—45)

This invention relates to poultry nests, and more specifically, the invention is directed to the provision of a unit formed of a plurality of connected compartmentalized nests.

One of the primary objects of this invention is to provide, as a unit, poultry nesting apparatus for constructing a plurality of individual nesting compartments which may be shipped in knocked-down form and which may be assembled quickly and with facility.

Another object of this invention is to provide apparatus of the type described above which may be assembled with but a minimum of connecting elements and with the use of conventional tools.

A further object of this invention is to provide poultry nesting apparatus of the type defined supra which is inexpensive to manufacture, non-complex in construction and assembly, and durable in use.

Other and further objects and advantages of this invention will become more evident from a consideration of the following specification when read in the light of the annexed drawings, in which:

Figure 1 is a perspective view of a poultry nesting unit constructed in accordance with the present invention.

Figure 2 is a fragmentary exploded perspective view of the unit shown in Figure 1.

Figure 3 is a perspective view of one of the compartments of the unit.

Figure 4 is a perspective view of an end closure panel for the unit.

Figure 5 is an enlarged fragmentary detail perspective view, partly in cross-section, illustrating the support means for the next member.

Figure 6 is an enlarged cross-sectional view taken on the vertical plane of line 6—6 of Figure 2, looking in the direction of the arrows.

Figure 7 is an enlarged fragmentary detail perspective view illustrating the perch supporting means.

Figure 8 is a perspective view of one of the nests.

Referring now more specifically to the drawings, reference numeral 10 designates, in general, a knock-down poultry nest constructed in accordance with the teachings of this invention. As illustrated therein, the nest is seen to comprise a plurality of nesting compartments 12, an end closure panel 14 for the unit, a pair of upper and lower perches 16 and 18, respectively, and means for rigidly connecting these elements together to form the unitary poultry nest 10.

Each of the nesting compartments is identical in construction and comprises a front panel 20 having a substantially rectangular configuration. The front panel 20 is provided with a pair of enlarged vertically aligned substantially circular access openings 22, 24 and a horizontally elongated substantially rectangular pair of slots 26 and 28, respectively, the slot 26 being disposed immediately below the opening 22 and the slot 28 being positioned immediately below the opening 24. A top wall 30 is integrally formed with the upper end of the front panel 20 and is inclined upwardly and rearwardly thereof. The front panel 20 is provided with an inwardly turned vertically extending substantially rectangular side flange 32 (see Figure 3), and the top wall 30 is constructed with a downwardly turned flange 34 which depends from the rear end thereof and a depending side flange 36. The flange 32 is provided with a plurality of vertically spaced and aligned apertures 38 and the side flange 36 has an aperture 40 formed therein adjacent the depending flange 34.

A vertically elongated substantially trapezoidal side panel 42 is integrally constructed with the front panel 20 and projects laterally rearwardly therefrom. The inclined upper marginal edge of the trapezoidal side panel 42 is received behind a depending side flange 44 of the top wall 30 and is fixedly secured thereto by conventional means such as, for example, welding. The lower end of the trapezoidal side panel 42 is constructed with an inwardly turned laterally extending flange 46 and the rear end is bent laterally inwardly to provide an end flange 48. A plurality of vertically spaced and aligned openings 50 are formed in the side panel 42 adjacent the front panel 20 and a second series of openings 52 also vertically spaced and aligned extend transversely through the side panel 42 adjacent the flange 48.

From the foregoing description of the nesting compartments 12, it will be understood that the compartments 12 are each open along the side thereof adjacent the closed side 42 of the adjacent compartment 12. Thus, in assembling a plurality of compartments 12 in the manner illustrated in Figure 1, it is necessary that the side of the last of the added compartments 12 must be provided as seen in Figure 4, with a closure member 14 having a substantially trapezoidal configuration, and having a vertically extending, laterally projecting side flange 54, a laterally and inwardly extending flange 56 at the lower end thereof, and a downwardly bent reverted flange 58 extending across the upper end thereof. The flange 58 is secured to the panel 14 as by welding to provide rigidity to the upper end thereof.

The end panel 14 is provided with a series of spaced vertically aligned apertures 60, in the marginal end thereof adjacent the flange 54, and a second series of vertically spaced and aligned apertures 62 disposed adjacent the front end of the panel.

The perch supporting means 64 is illustrated in detail in Figure 7 of the drawings. The perch supporting means 64, located at remotely disposed corners of the unit 10, is seen to comprise a vertically extending angle member 66 having pivotally secured thereto at 68 an elongated bracket 70 having a pair of laterally extending substantially rectangular flanges 72, 74 integrally formed therewith and spaced with respect to each other. The flanges 72, 74 at the opposite sides of the unit are disposed in confronting relation. An elongated substantially rectangular pair of perches 16, 18, are secured at their respective opposite ends by means of screws 76.

Figure 7 of the drawings illustrates the perches 16 and 18 as being in their lowered and raised positions. The perch 16, in its lowermost position, is prevented from further downward movement by means of the engagement of the flange 72 with the angle member 66. Means are provided for maintaining the perches 16, 18 in their upward position, such means comprising an elongated, substantially rectangular resilient trigger member 78, riveted at 80 to the bracket 70, the trigger having an end portion thereof projecting beyond the bracket 70 and terminating in a detent 82. The detent 82 normally engages against the angle member 66 when the perch 18 is in its elevated position, and is manually manipulated away therefrom to permit the perch 18 to be rotated to its lowermost position. As this pivotal movement takes place, the detent 82 makes sliding engagement with the side panel 42 and with the end closure panel 14.

In assembling the unit 10, a plurality of nesting compartments 12 are disposed in side-by-side relationship with the side panels 42 extending across and closing the open side of an adjacent compartment. When the last of the nesting compartments 12 has been so positioned, the end closure panel 14 is then set into place to effectively extend across and close the open side of the last of the compartments 12. The angle members 66 are then placed in position at the remote front corners of the compartments 12 and a plurality of elongated threaded bolts 84 are passed through the series of aligned apertures 50, 38, and through suitable openings formed in the angle members. Similar bolts extend through the aligned series of apertures 40 and 52. Nuts 86 are provided to cooperate with bolts 84 whereby the individual nesting compartments 12 may be drawn together as an integral rigid unit 10.

The elongated slots 26, 28, have the marginal edges thereof reverted to provide continuous flanges 88, 90 about the periphery thereof. As is seen in Figure 6 of the drawings, a pair of the bolts 84 extend in confronting realtionship relative to the lower edges of the flanges 88, 90, and are spaced therefrom to serve a function to be described.

Referring now more specifically to Figures 5, 6 and 8 of the drawings, each of the nests 92 is seen to comprise an elongated substantially rectangular strip of material which includes a central body portion 94 terminating at one of its ends in an upwardly and rearwardly inclined back wall 96 having a laterally and downwardly bent flange 98 at the extremity thereof. The construction is such as to provide a channel 100 which extends transversely of the main body portion 94 to serve a function to be described.

The other end of the main body portion 94 is crimped to form a downwardly turned transversely extending shoulder 102 which is integrally formed with a substantially vertically extending front wall 104 which terminates at its upper end in a laterally and outwardly extending lip 106.

The poultry nest is completed in its assembly by the insertion of a pair of the nests 92 within each of the compartments 12. As is seen in Figure 6, the nests 92 are disposed within the compartments 12 by interposing the shoulder 102 between the rods 84 and the reverted flanges 88, 90, with the lip 106 engaging over the reverted flanges 88, 90, at the uppermost side of the slots 26, 28. The bolts 84 at the rear end of the compartments 12 are then received within the channel 100 of each of the nests 92.

Having described and illustrated one embodiment of this invention in detail, it will be understood that the same is offered merely by way of example, and that the invention is to be limited only by the scope of the appended claims.

What is claimed is:

1. A poultry nest comprising a plurality of nesting compartments disposed in side by side relationship, each of said nesting compartments having a front panel provided with a plurality of spaced enlarged compartment access openings, a side panel for each of said compartments integrally connected to said front panel, a top wall integrally connected with the upper end of said front panel, each of said compartments having the side thereof opposite said side panel positioned in engagement with the side panel of the next adjacent compartment, a closure panel for the side opposite the side panel of the last compartment added to the nest, an angle member disposed at each of the remotely disposed front corners of said poultry nest and secured thereto, a pair of spaced brackets pivotally connected to said angle members, an elongated perch having its opposite ends carried by and secured to a horizontally aligned pair of said brackets, means on said brackets for eliminating the downward movement of said brackets, means on said brackets for holding said brackets in elevated position, means connecting said compartments and said angle members as a unit, a plurality of nests for each of said compartments, and means on said front panel cooperating with said compartment connecting means releasably securing said nests in said compartments.

2. A poultry nest comprising a plurality of nesting compartments disposed in side by side relation, each of said nesting compartments having a front panel provided with a plurality of spaced enlarged compartment access openings, a side panel for each of said compartments, said side panels being integrally formed with said front panel and having an inclined upper edge, a top wall having one of its edges integrally connected with the upper end of said front panel, a flange depending from one side edge of said top wall, means connecting said flange to the upper inclined end of said side panel, an inwardly turned flange formed on the edge of said front panel opposite said side panel, a flange extending from said side panel at the rear end thereof, a flange extending from said side panel at the lower end thereof, each of said compartments having the side thereof opposite said side panel positioned in engagement with the side panel of the next adjacent compartment, a closure panel for the side opposite the side panel of the last compartment added to the nest, supporting means mounted on said poultry nest, an elongated substantially rectangular perch having its opposite ends carried by said supporting means, a plurality of nest bottoms for said nest, and means for supporting said nest bottoms in said compartments.

3. A poultry nest comprising a plurality of nesting compartments disposed in side by side relationship, each of said nesting compartments having a front panel provided with a plurality of spaced enlarged compartment access openings, a side panel for each of said compartments integrally carried by said front panel, a top wall integrally connected with the upper end of said front panel, each of said compartments having the side thereof opposite said side panel positioned in engagement with the side panel of the next adjacent compartment, a closure panel for the side opposite the side panel of the last compartment added to the nest, support means disposed in each of the remotely disposed front corners of said poultry nest, said support means each comprising an angle member, and a pair of spaced brackets connected to said angle member, an elongated substantially rectangular perch having its opposite ends carried by a horizontally aligned pair of said brackets, a plurality of nest bottoms for said unit, said nest bottoms each comprising an elongated central body portion, a rearwardly and upwardly inclined back wall formed on one end of said body portion, a rearwardly bent flange on the upper end of said back wall, a depending shoulder formed at the other end of said body portion, a front wall integrally formed on said shoulder and extending vertically therefrom, said nest bottoms being disposed within said compartments, and means in said compartments supporting said back wall and said shoulder.

4. A poultry nest comprising a plurality of nesting compartments disposed in side by side relationship, each of said nesting compartments having a front panel provided with a plurality of spaced enlarged compartment access openings, a side panel carried by said front panel on each of said compartments, a top wall integrally connected with the upper end of said front panel, each of said compartments having the side opposite said side panel positioned in engagement with the side panel of the next adjacent compartment, a closure panel for the side opposite the side panel of the last compartment added to the nest, support means disposed in each of the remotely disposed front corners of said poultry nest, an elongated perch having a substantially rectangular configuration extending between and supported on said support means, a plurality of nest bottoms, and means disposed in said compartments releasably securing said nest bottoms therein.

5. A poultry nest comprising a plurality of nesting compartments disposed in side by side relationship, each of said nesting compartments having a front panel provided with a plurality of spaced enlarged compartment access openings, a side panel for each of said compartments having upper inclined ends, said side panel being integrally formed with said front panel, a top wall having one of its sides integrally connected with the upper end of said front panel and being provided with a flange at the side thereof adapted to receive the upper inclined end of said side panel, each of said compartments having the side opposite said side panel positioned in engagement with the side panel of the next adjacent compartment, a closure panel for the side opposite the side panel of the last compartment added to the nest, perch means disposed below each of said enlarged openings and secured to said nest, a plurality of nest bottoms for each of said compartments, and means disposed within said compartments for supporting said nest bottoms.

6. A poultry nest comprising a plurality of nesting compartments disposed in side by side relationship, each of said nesting compartments having a front panel provided with a plurality of spaced enlarged compartment access openings, a side panel for each of said compartments carried by said front panel, a top wall integrally connected with the upper end of said front panel, each of said compartments having the side opposite said side panel positioned in engagement with the side panel of the next adjacent compartment, a closure panel for the side opposite the side panel of the last compartment added to the nest, support means disposed at each of the remotely disposed front corners of said poultry nest, an elongated substantially rectangular perch having its opposite ends carried by said support means, a plurality of nest bottoms for said unit, said nest bottoms each comprising an elongated central body portion, a rearwardly and upwardly inclined back wall extending integrally upwardly from one edge of said body portion, a rearwardly bent flange formed on the upper end of said back wall, a depending shoulder formed at the other end of said body portion, a front wall extending integrally upwardly from said shoulder, said nest bottoms being disposed within said compartments, and means in said compartments supporting said back wall and said shoulder.

7. A poultry nest comprising a plurality of nesting compartments disposed in side by side relationship, each of said nesting compartments having an elongated substantially rectangular front panel provided with at least one enlarged compartment access opening, a substantially trapezoidal side panel for each of said compartments, said side panel being integrally formed with said front panel, a substantially rectangular top wall having one of its sides integrally connected with the upper end of said front panel, each of said compartments having the side opposite said side panel positioned in engagement with the side panel of the next adjacent compartment, a substantially trapezoidal closure member for the side opposite said side panel of the last compartment added to the nest, a perch disposed below said openings and secured to said poultry nest, means rigidly connecting together said compartments, and means on said front panel cooperating with said last named means for supporting at least one nest bottom in each of said compartments.

References Cited in the file of this patent
UNITED STATES PATENTS

| | | |
|---|---|---|
| 2,262,795 | Carlstrom | Nov. 18, 1941 |
| 2,728,324 | Radocy | Dec. 27, 1955 |